United States Patent
Kuroki et al.

(10) Patent No.: US 8,771,839 B2
(45) Date of Patent: Jul. 8, 2014

(54) COMPOSITE MATERIAL

(71) Applicant: Hitachi Cable, Ltd., Tokyo (JP)

(72) Inventors: Kazuma Kuroki, Hitachinaka (JP);
Hiromitsu Kuroda, Hitachi (JP);
Tetsuya Tokumitsu, Hitachi (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 13/742,607

(22) Filed: Jan. 16, 2013

(65) Prior Publication Data

US 2013/0189541 A1   Jul. 25, 2013

(30) Foreign Application Priority Data

Jan. 23, 2012   (JP) ................. 2012-011355

(51) Int. Cl.
*B32B 15/04* (2006.01)
*B32B 15/18* (2006.01)
*B32B 15/20* (2006.01)

(52) U.S. Cl.
USPC ........... 428/685; 428/682; 428/680; 428/653; 428/649; 428/213

(58) Field of Classification Search
USPC ......... 428/685, 684, 682, 680, 679, 659, 653, 428/649, 674, 676, 677, 332, 213, 214, 215, 428/220
See application file for complete search history.

(56) References Cited

U.S. PATENT DOCUMENTS

| | | | | |
|---|---|---|---|---|
| 3,230,078 A | * | 1/1966 | Webb et al. | 420/434 |
| 3,868,279 A | * | 2/1975 | Nachman et al. | 148/686 |
| 4,818,634 A | * | 4/1989 | Bliss | 428/677 |
| 4,873,149 A | * | 10/1989 | Shinoda et al. | 428/609 |

FOREIGN PATENT DOCUMENTS

| | | |
|---|---|---|
| JP | 64-014027 A | 1/1989 |
| JP | 02-217184 A | 8/1990 |
| JP | 2513298 B2 * | 4/1996 |

OTHER PUBLICATIONS

Machine Translation, Yamaguchi et al., JP 2513298 B2, Apr. 1996.*
American Iron and Steel Institute, "High-Temperature Characteristics of Stainless Steels," pp. 1 and 5-7 (no date), downloaded from www.nickelinstitute.org on Sep. 6, 2013.*
Timken, "Practical Data for Metallurgists, Sixteenth Edition," pp. 1-8, (2009, no month), downloaded from www.timken.com on Sep. 6, 2013.*

* cited by examiner

*Primary Examiner* — Michael E La Villa
(74) *Attorney, Agent, or Firm* — Roberts Mlotkowski Safran & Cole P.C.

(57) ABSTRACT

A composite material includes a clad material including a base material that includes an iron-chromium alloy and vibration-damping layers that are provided on both surfaces of the base material and include a metal to suppress a vibration. A total thickness of the vibration-damping layers provided on the both surfaces of the base material is in a range of not less than 10% and not more than 40% relative to a total thickness of the clad material.

6 Claims, 1 Drawing Sheet

COMPOSITE MATERIAL

The present application is based on Japanese patent application No. 2012-011355 filed on Jan. 23, 2012, the entire contents of which are incorporated herein by reference.

BACKGROUND OF THE INVENTION

1. Field of the Invention

The invention relates to a composite material used in industrial machinery, consumer appliances and other various fields, and particular, to a composite material having vibration-damping properties.

2. Description of the Related Art

The term "vibration-damping property" used herein is to be understood to include a vibration-damping function.

A composite material having vibration-damping properties is considered to be used in industrial machinery, consumer appliances and other various fields. Use thereof in a vehicle will be described as an example. A vehicle has a lot of vibration sources including a drive-train such as engine. Therefore, it is desirable that a composite material having vibration-damping properties be used for a vibration source or peripheral equipments to reduce generation of vibration itself or influence thereof as much as possible.

A laminated damping steel sheet is proposed as a damping material having such a vibration-damping function. The laminated damping steel sheet has a structure in which a sheet made of a resin is arranged between two steel sheets such that the resin sandwiched between the two steel sheets acts to absorb vibration. Such a technique is disclosed in JP-A-S64-014027.

Another example is a clad spring material having a three-layer structure in which copper layers are provided on both surfaces of stainless steel. The three-layer clad spring material has a non-joined portion formed at an interface between the stainless steel and the copper layer so that vibration is absorbed at the non-joined portion. Such a technique is disclosed in JP-A-H02-217184.

SUMMARY OF THE INVENTION

A composite material having vibration-damping properties used in various fields including the industrial machinery field and the consumer appliance field is required to have sufficient strength to withstand vibration and to be durable for use in a high-temperature environment.

In considering the actual use of a composite material having vibration-damping properties in, e.g., a vehicle, it is expected that temperature of a vibration source or a portion affected by vibration increases while the vehicle is moving. Accordingly, it is desirable not only to simply have vibration-damping properties but also to allow the use in a high-temperature environment. It is obvious that such a composite material having vibration-damping properties which is durable for use in a high-temperature environment is demanded not only for a vehicle but also in various fields. However, at present, use of a damping material including a composite material having vibration-damping properties in a high-temperature environment has not been sufficiently examined.

The laminated damping steel sheet described in JP-A-S64-014027 has a structure in which the resin sheet sandwiched between the two steel sheets absorbs vibration. However, use of such a laminated damping steel sheet in a high-temperature environment has a problem in that the resin sandwiched between the two steel sheets deteriorates due to influence of high temperature.

Meanwhile, the clad spring material having a three-layer structure disclosed in JP-A-H02-217184 has a structure in which the non-joined portion formed at an interface between the stainless steel and the copper layer absorbs vibration. However, since a portion of the interface between the stainless steel and the copper layer is not joined, the joined portion between the stainless steel and the copper layer cannot withstand vibration if application of vibration to the non-joined portion in a high-temperature environment continues, and the non-joined portion may gradually expand, i.e., the copper layer may be separated from the stainless steel. That is, to the three-layer clad spring material having such a structure, it is difficult to impart sufficient strength to withstand vibration applied in a high-temperature environment.

Accordingly, it is an object of the invention to provide a composite material that has vibration-damping properties and strength usable under a high-temperature environment.

(1) According to one embodiment of the invention, a composite material comprises:

a clad material comprising a base material that comprises an iron-chromium alloy and vibration-damping layers that are provided on both surfaces of the base material and comprise a metal to suppress a vibration, wherein a total thickness of the vibration-damping layers provided on the both surfaces of the base material is in a range of not less than 10% and not more than 40% relative to a total thickness of the clad material.

In the above embodiment (1) of the invention, the following modifications and changes can be made.

(i) The clad material has a damping coefficient of not less than 4.5% at 200° C.

(ii) The clad material has a tensile strength of not less than 400 MPa at 200° C.

(iii) The vibration-damping layers comprise at least one of pure nickel, pure iron, pure magnesium, Al-78Zn, Mg-0.6Zr and Cu-44Mn-2Al.

(iv) The clad material has a total thickness of not less than 1 mm and not more than 5 mm.

(v) The vibration-damping layers comprise a same material and have substantially a same thickness.

Effects of the Invention

According to one embodiment of the invention, a composite material can be provided that has vibration-damping properties and strength usable under a high-temperature environment.

BRIEF DESCRIPTION OF THE DRAWINGS

Next, the present invention will be explained in more detail in conjunction with appended drawings, wherein.

DETAILED DESCRIPTION OF THE PREFERRED EMBODIMENTS

Structure of Composite Material of the Invention

Figure 1:
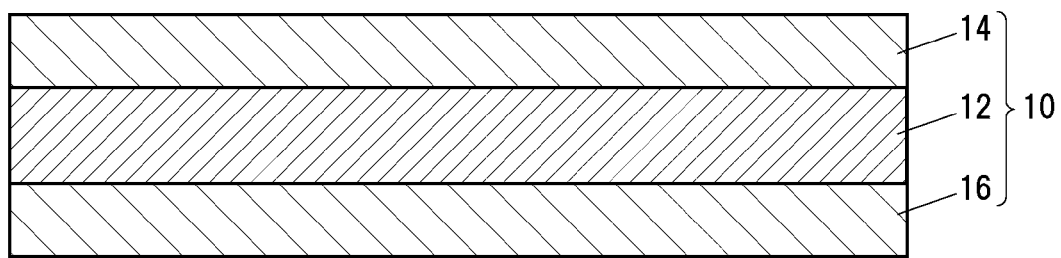
FIG. 1 is a cross sectional view showing a composite material of the present invention.

The mode for carrying out the invention (hereinafter, referred to as "embodiment") will be described below in conjunction with the drawings. FIG. 1 is a cross sectional view showing a composite material 10 of the invention, and in the present embodiment, the composite material 10 is formed of a clad material. The composite material 10 which is a clad material is provided with a base material 12, a first vibration-damping layer 14 attached to one surface of the base material 12 and a second vibration-damping layer 16 attached to another surface of the base material 12.

The base material 12 is made of an iron-chromium alloy, e.g., SUS430. Meanwhile, the first vibration-damping layer 14 is formed of a metal which suppresses vibration, e.g., pure nickel. The second vibration-damping layer 16 is formed of a metal which suppresses vibration, e.g., pure nickel in the same manner as the first vibration-damping layer 14. The composite material 10 shown in FIG. 1 is a clad material having a laminated structure in which the base material 12 is sandwiched between the first vibration-damping layer 14 attached to one surface thereof and the second vibration-damping layer 16 attached to another surface.

Here, high-purity nickel, especially pure nickel, described as an example of a material used for the first vibration-damping layer 14 and the second vibration-damping layer 16 is a material which exhibits a high vibration-damping function by itself. Meanwhile, SUS430 mentioned above is a typical type of ferrite-based stainless steel not containing nickel, and has a higher vibration-damping function among stainless steels. Alternatively, the iron-chromium alloy constituting the composite material 10 may be a ferrite-based stainless steel other than stainless steel SUS430. It is possible to use, e.g., SUS405 (Fe—Cr—Al), SUS409 and SUS430LX (Fe—Cr—Nb, Ti), etc.

In addition to pure nickel, it is possible to use pure metals such as pure iron and pure magnesium for the material used as the first vibration-damping layer 14 and the second vibration-damping layer 16. In addition, it is possible to use alloys such as Al-78Zn, Mg-0.6Zr and Cu-44Mn-2Al. One type of the above-mentioned pure metals or alloys may be selected and used alone, or plural types thereof may be used. Since such a metal which suppresses vibration is used taking into consideration the use of the composite material 10 at high temperature of e.g., not less than 200° C., it is possible to obtain a composite material of which vibration-damping function is not impaired in a high-temperature environment of more than 200° C.

Among such metal materials, the above-mentioned pure nickel is preferable in view of productivity in a rolling process and the cost, but it is not limited thereto and it is possible to appropriately select a suitable metal material depending on the intended purpose or the use environment of the composite material 10.

In the embodiment shown in FIG. 1, pure nickel is used as a material of the first vibration-damping layer 14 and the second vibration-damping layer 16. This facilitates the clad rolling process and it is possible to produce a high-quality clad material even if the thickness of pure nickel is reduced relative to the thickness of the entire clad material. It is possible to maintain high quality even when, e.g., the thickness of the pure nickel as the total of the first vibration-damping layer 14 and the second vibration-damping layer 16 is reduced to about 10% of the thickness of the entire clad material.

In the embodiment shown in FIG. 1, the same metal material is used for the first vibration-damping layer 14 and the second vibration-damping layer 16. The first vibration-damping layer 14 and the second vibration-damping layer 16 do not necessarily need to be formed of the same material and different metal materials which are mentioned above may be combined. Note that, in addition to pure nickel, it is possible to use the above-mentioned pure metals or alloys as such metal materials.

Especially by using the same metal material for the first vibration-damping layer 14 and the second vibration-damping layer 16 which are attached to the both surfaces of the base material 12, it is very easy to perform a clad rolling process. When the clad rolling process is performed on, e.g., two layers, warping is likely to occur by being pressed during the clad rolling process. In addition, since the first vibration-damping layer 14 and the second vibration-damping layer 16 are formed of the same metal material so as to have substantially the same thickness, characteristic change does not occur on front and back surfaces of the composite material, and a user can use the composite material without checking front and back. In addition, the user does not need to check the front and back sides of the composite material when processing is carried out based on the intended use. In addition, it is not necessary to consider a relation between the front or back of the composite material and a vibration source. The composite material having such a structure is very easy to use.

Method of Manufacturing the Composite Material

Next, a method of manufacturing the composite material 10 will be described in reference to FIG. 2. A clad material having a three-layer structure shown in FIG. 1 is a laminated sheet composed of three sheets attached to each other by cold rolling. The laminated sheet is formed by the clad-attaching cold rolling and, if required, is further processed by rolling so as to have a predetermined thickness. Such a series of processes is described herein as a clad rolling process.

A specific example is as follows. Pure nickel constituting the first vibration-damping layer 14, SUS430 constituting the base material 12 and pure nickel constituting the second vibration-damping layer 16 are prepared. The materials used are generally wound in a coiled manner. Surfaces of the metal materials respectively to be bonding surfaces are cleaned and then polished by a metal brush. Subsequently, pressure-welding rolling is performed by processing rolls 22 in a state that the bonding surfaces face each other, as shown in FIG. 2. Here, rolling reduction in the pressure-welding rolling is desirably around 60%. Such a level of rolling reduction provides good adhesion of the metal materials to each other and it is thus possible to obtain a robust clad material. After the clad-attaching rolling process, finish rolling for finishing the material with a predetermined thickness is performed if required.

In addition, it is possible to add an annealing process in the middle if work hardening due to the clad rolling process is remarkable. Here, an annealing temperature is, e.g., 1000° C. and annealing time is, e.g., about 5 minutes. Although interdiffusion between SUS430 and pure nickel occurs at a clad interface during the annealing process, brittle compound layers, etc., are not formed and it is thus possible to roll and anneal repeatedly.

Thickness of Vibration-Damping Layer Relative to Thickness of Entire Clad Material Next, a preferred sheet thickness configuration will be described. The pure nickel layers constituting the first vibration-damping layer 14 and the second vibration-damping layer 16 which cover the both surfaces of the base material 12 each have the same thickness. By configuring as such, warping of the composite material as a clad material rolled in the clad rolling process can be reduced. If, e.g., a sheet thickness of the metal material of the first vibration-damping layer 14 and that of the second vibration-damping layer 16 are different from each other on the both surfaces of the base material 12, warping in one direction is likely to occur in the material after being processed.

In addition, the total thickness of the pure nickel layers, i.e., the total thickness of the first vibration-damping layer 14 and the second vibration-damping layer 16 is desirably within a range of not less than 10% and not more than 40% relative to the total thickness of the clad material, i.e., relative to the thickness of the entire composite material 10. When the total thickness of the pure nickel layers is less than 10% of the total thickness of the clad material, a vibration-damping effect of the pure nickel layer is not sufficiently exhibited. Note that, when a ratio of the pure nickel layer is reduced, it is difficult to maintain quality during the clad rolling process. However, it is possible to maintain sufficient quality if the total thickness of the pure nickel layers is 10% of the total thickness of the clad material. On the other hand, when the total thickness of the pure nickel layers is more than 40% of the total thickness of the clad material, an effect of improving mechanical strength by using stainless steel for a base material is not sufficiently exhibited. In addition, the use amount of nickel metal increases, which results in an increase in the material cost.

It should be noted that, in the metal materials acting to suppress vibration such as stainless steel, pure nickel and above-mentioned pure metals and alloys, variation in a ratio of the sheet thicknesses of the constituent metals before the clad rolling process to that after the clad rolling process is very small and can be totally ignored in view of accuracy related to characteristics, etc., and accordingly, a ratio of the thickness of the base material 12 to that of the first vibration-damping layer 14 to that of the second vibration-damping layer 16 after the clad rolling process can be considered to be the same as a sheet thickness ratio of the respective metal materials before the clad rolling process. This matter is not limited to the three-layer structure shown in FIG. 1 and the same applies to other structures such as a two-layer structure.

Thickness of the Entire Clad Material and Sheet Thickness of Vibration-Damping Metal Material Next, the thickness of the clad material formed by the clad rolling process will be described. The thickness of the entire clad material formed by the clad rolling process is desirably not less than 1 mm and not more than 5 mm. When the thickness of the entire clad material is less than 1 mm, vibration of the entire material is too large and the vibration-damping function is less likely to be exhibited. In the composite material 10 of the invention which is formed of a clad material, stainless steel is used as the base material 12 which acts as a rigid body to some extent against mechanical vibration and acts to convert and consume vibration energy of the vibration-damping layer, etc., into other energy such as heat. When the thickness of the entire clad material is small such as less than 1 mm, the entire clad material wobbles and the above-mentioned effects are reduced.

Figure 2:
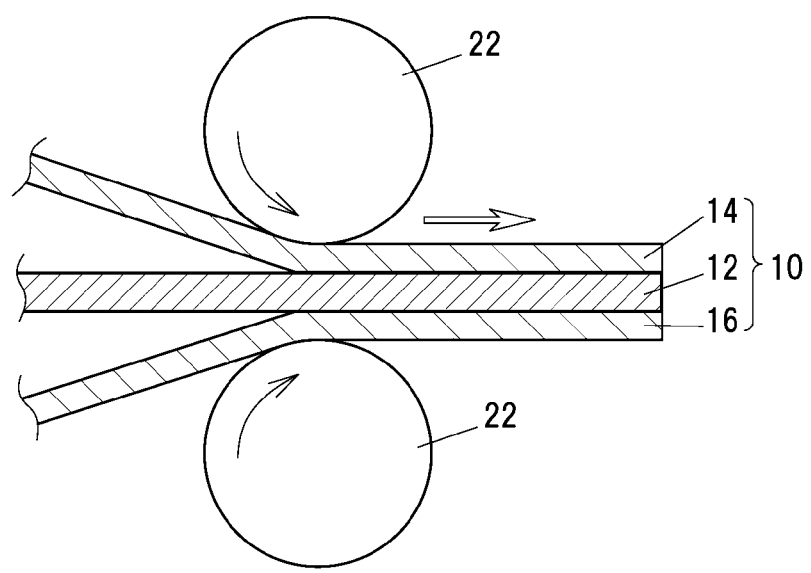
FIG. 2 is an explanatory diagram illustrating a method of manufacturing the composite material of the invention.

As described above, in order to sufficiently adhere different metals such as stainless steel and pure nickel to each other in the clad rolling process, the rolling reduction in the pressure-welding rolling using the processing rolls 22 shown in FIG. 2 is desirably around 60%. The thickness of the material prepared before the clad rolling process is more than 10 mm so that the clad material formed after the clad rolling process has a thickness of more than 5 mm, but this arises a problem in productivity. For example, a large-scale apparatus is required to allow the rolling and also a roll life may be shortened due to overload. In addition, if the entire clad material is thick, a sheet material such as pure nickel, etc., is required to be thick but it is difficult to prepare a nickel sheet having such a thickness. In other words, it is difficult to obtain a metal sheet to be a material.

The use environment of a product to which the clad material of the invention is applied is desirably not more than 300° C. This is because the vibration-damping effect of the nickel layer is maintained up to the Curie point (358° C.).

The effects achieved by the embodiment of the invention are listed below.

Improvement in Convenience of Composite Material for Users

In the embodiment, the composite material is configured that stainless steel having a high mechanical strength is used as the base material and the same type of metal material having a high vibration-damping function and the same thickness is attached to the both surfaces of the base material. Due to this configuration, the composite material does not have a difference in characteristics between the front and back sides and thus has the same characteristics on each surface. It is effective for a user of this material since it is not necessary to check front and back when processing the composite material. This effect leads to improvement in productivity for the user.

In addition, since the composite material has a three-layer structure and does not have a difference in characteristics between the front and back surfaces as described above, it is not necessary to check the orientation of the front or back surface of the composite material with respect to a vibration source and it is very convenient for the user.

Since stainless steel having a high strength is used as the base material, the composite material of the embodiment can be used for a portion to which a force is applied, and thus can be broadly used. In addition, it is easy to select the thickness of the clad material as a composite material within a range from about 1 mm to about 5 mm and it is possible to select the thickness of the clad material according to the intended use of the user.

As described above, materials other than nickel metal can be also used as the material having a high vibration-damping function. It is possible to use, e.g., pure metals such as pure iron and pure magnesium. In addition, it is possible to use alloys such as Al-78Zn, Mg-0.6Zr and Cu-44Mn-2Al. One type of the above-mentioned pure metals or alloys may be selected and used alone, or plural types thereof may be used. Along with the spread of use of the present invention in the future, various fields of use will be emerged and various ways of use will be revealed. Considering various conditions of use which are revealed in the future, it will not be possible to accommodate various demands of users under the assumption of only using nickel metal as the material having a high vibration-damping function. Since it is possible to use the above-mentioned types of materials, it is possible to broadly meet a variety of conditions required by the users.

Improvement in Productivity

In the embodiment, a three-layer structure is adopted for the composite material, which facilitates the clad rolling process as compared to a two-layer structure and also leads to improvement in quality of the composite material.

In the embodiment, pure nickel is used as the metal material having a high vibration-damping function. Pure nickel metal is very suitable for the clad rolling process. The pure nickel metal not only having a high vibration-damping function but also greatly facilitating the clad rolling process is very excellent in productivity.

When the clad rolling process is performed, a large difference in hardness between the overlapped metal materials makes the rolling difficult. In the embodiment, stainless steel is laminated so as to be sandwiched between pure nickels and then is rolled. There is no large difference in hardness between these materials from the viewpoint of the clad rolling process technique and the rolling can be satisfactory. Since it is easy to perform the clad rolling process, the thickness of the pure nickel sheet can be reduced to 10% of the thickness of the entire clad material depending on the intended use. It is possible to maintain high productivity for a variety of specifications required by customers.

Excellent Characteristics and High Quality

Since the composite material is configured that stainless steel having a high strength is used as the base material and the metal material having a high vibration-damping function is attached to the both surfaces of the base material by the clad rolling process, the composite material is not only excellent in vibration-damping properties in a high-temperature environment but also can sufficiently accommodate public needs for strength.

Since the composite material has a three-layer structure in which the same type of metal material having the same thickness is attached to the both surface of metal of the base material, it is possible to produce a clad material having better characteristics as well as high quality.

Since pure nickel is used as the metal material having a high vibration-damping function, it is possible to produce a high-quality clad material.

EXAMPLES

In each of Examples 1 to 6 and Comparative Examples 1 to 8 described below, a stainless sheet is used as the base material 12, pure nickel sheets are attached to both surfaces thereof by cold rolling to form a clad material, and finish rolling is performed so that the final sheet thickness of the clad material in each of Examples and Comparative Examples is 2.0 mm. A ratio of the total sheet thickness of the pure nickel layers to the final sheet thickness in each of Examples and Comparative Examples is calculated based on a ratio of the total thickness of the pure nickel layers to the total thickness of the three-layer structure before rolling.

Example 1

A SUS430 sheet having a thickness of 4.5 mm was prepared as the base material 12. The prepared SUS430 sheet is coiled. In addition, a pure nickel sheet having a thickness of 0.25 mm and wound in a coiled manner was prepared as the first vibration-damping layer 14 and the second vibration-damping layer 16. Surfaces of the SUS430 sheet and of the two pure nickel sheets, which are to be facing surfaces when being stacked to form a three-layer structure shown in FIG. 1, were cleaned and brushed. The cleaned surfaces were exposed and cold rolling was performed in the air by the processing rolls 22, thereby respectively attaching the pure nickel sheets on both surfaces of the SUS430. The total thickness of these sheets before rolling is 5.0 mm. Meanwhile, the total thickness of the pure nickel sheets corresponding to the first vibration-damping layer 14 and the second vibration-damping layer 16 is 0.5 mm. Therefore, a ratio of the total thickness of the pure nickel sheets to the total sheet thickness (a nickel sheet ratio) is 10%. The sheet thickness of the composite material obtained after cold rolling was 2.1 mm. Finish rolling was further performed on the composite material, thereby obtaining a 2.0 mm-thick composite material.

Example 2

A SUS430 sheet having a thickness of 4.0 mm and wound in a coiled manner was prepared as the base material 12. In addition, a pure nickel sheet having a thickness of 0.5 mm and wound in a coiled manner was prepared as the first vibration-damping layer 14 and the second vibration-damping layer 16. Surfaces of the SUS430 sheet and of the two pure nickel sheets, which are to be facing surfaces when being stacked to form a three-layer structure shown in FIG. 1, were cleaned and brushed. The cleaned surfaces were exposed and cold rolling was performed in the air by the processing rolls 22, thereby respectively attaching the pure nickel sheets on both surfaces of the SUS430. The total thickness of these sheets before rolling is 5.0 mm. Meanwhile, the total thickness of the pure nickel sheets corresponding to the first vibration-damping layer 14 and the second vibration-damping layer 16 is 1.0 mm. Therefore, a ratio of the total thickness of the pure nickel sheets to the total sheet thickness (a nickel sheet ratio) is 20%. The sheet thickness of the composite material obtained after cold rolling was 2.1 mm. Finish rolling was further performed on the composite material, thereby obtaining a 2.0 mm-thick composite material.

Example 3

A SUS405 sheet having a thickness of 4.5 mm and wound in a coiled manner was prepared as the base material 12. In addition, a pure nickel sheet having a thickness of 0.25 mm and wound in a coiled manner was prepared as the first vibration-damping layer 14 and the second vibration-damping layer 16. Surfaces of the SUS405 sheet and of the two pure nickel sheets, which are to be facing surfaces when being stacked to form a three-layer structure shown in FIG. 1, were cleaned and brushed. The cleaned surfaces were exposed and cold rolling was performed in the air by the processing rolls 22, thereby respectively attaching the pure nickel sheets on both surfaces of the SUS405. The total thickness of these sheets before rolling is 5.0 mm. Meanwhile, the total thickness of the pure nickel sheets corresponding to the first vibration-damping layer 14 and the second vibration-damping layer 16 is 0.5 mm. Therefore, a ratio of the total thickness of the pure nickel sheets to the total sheet thickness (a nickel sheet ratio) is 10%. The sheet thickness of the composite material obtained after cold rolling was 2.1 mm. Finish rolling was further performed on the composite material, thereby obtaining a 2.0 mm-thick composite material.

Example 4

A SUS405 sheet having a thickness of 3.0 mm and wound in a coiled manner was prepared as the base material 12. In addition, a pure nickel sheet having a thickness of 1.0 mm and wound in a coiled manner was prepared as the first vibration-damping layer 14 and the second vibration-damping layer 16. Surfaces of the SUS405 sheet and of the two pure nickel sheets, which are to be facing surfaces when being stacked to form a three-layer structure shown in FIG. 1, were cleaned and brushed. The cleaned surfaces were exposed and cold rolling was performed in the air by the processing rolls 22, thereby respectively attaching the pure nickel sheets on both surfaces of the SUS405. The total thickness of these sheets before rolling is 5.0 mm. Meanwhile, the total thickness of the pure nickel sheets corresponding to the first vibration-damping layer 14 and the second vibration-damping layer 16 is 2.0 mm. Therefore, a ratio of the total thickness of the pure nickel sheets to the total sheet thickness (a nickel sheet ratio) is 40%. The sheet thickness of the composite material obtained after cold rolling was 2.1 mm. Finish rolling was further performed on the composite material, thereby obtaining a 2.0 mm-thick composite material.

Example 5

A SUS409 sheet having a thickness of 4.25 mm and wound in a coiled manner was prepared as the base material 12. In addition, a pure nickel sheet having a thickness of 0.375 mm and wound in a coiled manner was prepared as the first vibration-damping layer 14 and the second vibration-damping layer 16. Surfaces of the SUS409 sheet and of the two pure nickel sheets, which are to be facing surfaces when being stacked to form a three-layer structure shown in FIG. 1, were cleaned and brushed. The cleaned surfaces were exposed and cold rolling was performed in the air by the processing rolls 22, thereby respectively attaching the pure nickel sheets on both surfaces of the SUS409. The total thickness of these sheets before rolling is 5.0 mm. Meanwhile, the total thickness of the pure nickel sheets corresponding to the first vibration-damping layer 14 and the second vibration-damping layer 16 is 0.75 mm. Therefore, a ratio of the total thickness of the pure nickel sheets to the total sheet thickness (a nickel sheet ratio) is 15%. The sheet thickness of the composite material obtained after cold rolling was 2.1 mm. Finish rolling was further performed on the composite material, thereby obtaining a 2.0 mm-thick composite material.

Example 6

A SUS409 sheet having a thickness of 3.75 mm and wound in a coiled manner was prepared as the base material 12. In addition, a pure nickel sheet having a thickness of 0.63 mm and wound in a coiled manner was prepared as the first vibration-damping layer 14 and the second vibration-damping layer 16. Surfaces of the SUS409 sheet and of the two pure nickel sheets, which are to be facing surfaces when being stacked to form a three-layer structure shown in FIG. 1, were cleaned and brushed. The cleaned surfaces were exposed and cold rolling was performed in the air by the processing rolls 22, thereby respectively attaching the pure nickel sheets on both surfaces of the SUS409. The total thickness of these sheets before rolling is 5.01 mm. Meanwhile, the total thickness of the pure nickel sheets corresponding to the first vibration-damping layer 14 and the second vibration-damping layer 16 is 1.26 mm. Therefore, a ratio of the total thickness of the pure nickel sheets to the total sheet thickness (a nickel sheet ratio) is 25%. The sheet thickness of the composite material obtained after cold rolling was 2.1 mm. Finish rolling was further performed on the composite material, thereby obtaining a 2.0 mm-thick composite material.

Comparative Example 1

A SUS430 sheet having a thickness of 4.9 mm and wound in a coiled manner was prepared as the base material 12. In addition, a pure nickel sheet having a thickness of 0.05 mm and wound in a coiled manner was prepared as the first vibration-damping layer 14 and the second vibration-damping layer 16. Surfaces of the SUS430 sheet and of the two pure nickel sheets, which are to be facing surfaces when being stacked to form a three-layer structure shown in FIG. 1, were cleaned and brushed. The cleaned surfaces were exposed and cold rolling was performed in the air by the processing rolls 22, thereby respectively attaching the pure nickel sheets on both surfaces of the SUS430. The total thickness of these sheets before rolling is 5.0 mm. Meanwhile, the total thickness of the pure nickel sheets corresponding to the first vibration-damping layer 14 and the second vibration-damping layer 16 is 0.1 mm. Therefore, a ratio of the total thickness of the pure nickel sheets to the total sheet thickness (a nickel sheet ratio) is 2%. The sheet thickness of the composite material obtained after cold rolling was 2.1 mm. Finish rolling was further performed on the composite material, thereby obtaining a 2.0 mm-thick composite material.

Comparative Example 2

A SUS430 sheet having a thickness of 4.9 mm and wound in a coiled manner was prepared as the base material 12. In addition, a pure nickel sheet having a thickness of 0.08 mm and wound in a coiled manner was prepared as the first vibration-damping layer 14 and the second vibration-damping layer 16. Surfaces of the SUS430 sheet and of the two pure nickel sheets, which are to be facing surfaces when being stacked to form a three-layer structure shown in FIG. 1, were cleaned and brushed. The cleaned surfaces were exposed and cold rolling was performed in the air by the processing rolls 22, thereby respectively attaching the pure nickel sheets on both surfaces of the SUS430. The total thickness of these sheets before rolling is 5.06 mm. Meanwhile, the total thickness of the pure nickel sheets corresponding to the first vibration-damping layer 14 and the second vibration-damping layer 16 is 0.16 mm. Therefore, a ratio of the total thickness of the pure nickel sheets to the total sheet thickness (a nickel sheet ratio) is 3%. The sheet thickness of the composite material obtained after cold rolling was 2.1 mm. Finish rolling was further performed on the composite material, thereby obtaining a 2.0 mm-thick composite material.

Comparative Example 3

A SUS430 sheet having a thickness of 2.5 mm and wound in a coiled manner was prepared as the base material 12. In addition, a pure nickel sheet having a thickness of 1.25 mm and wound in a coiled manner was prepared as the first vibration-damping layer 14 and the second vibration-damping layer 16. Surfaces of the SUS430 sheet and of the two pure nickel sheets, which are to be facing surfaces when being stacked to form a three-layer structure shown in FIG. 1, were cleaned and brushed. The cleaned surfaces were exposed and cold rolling was performed in the air by the processing rolls 22, thereby respectively attaching the pure nickel sheets on both surfaces of the SUS430. The total thickness of these sheets before rolling is 5.0 mm. Meanwhile, the total thickness of the pure nickel sheets corresponding to the first vibration-damping layer 14 and the second vibration-damping layer 16 is 2.5 mm. Therefore, a ratio of the total thickness of the pure nickel sheets to the total sheet thickness (a nickel sheet ratio) is 50%. The sheet thickness of the composite material obtained after cold rolling was 2.1 mm. Finish rolling was further performed on the composite material, thereby obtaining a 2.0 mm-thick composite material.

Comparative Example 4

A SUS405 sheet having a thickness of 4.7 mm and wound in a coiled manner was prepared as the base material 12. In addition, a pure nickel sheet having a thickness of 0.15 mm and wound in a coiled manner was prepared as the first vibration-damping layer 14 and the second vibration-damping layer 16. Surfaces of the SUS405 sheet and of the two pure nickel sheets, which are to be facing surfaces when being stacked to form a three-layer structure shown in FIG. 1, were cleaned and brushed. The cleaned surfaces were exposed and cold rolling was performed in the air by the processing rolls 22, thereby respectively attaching the pure nickel sheets on both surfaces of the SUS405. The total thickness of these sheets before rolling is 5.0 mm. Meanwhile, the total thickness of the pure nickel sheets corresponding to the first vibration-damping layer 14 and the second vibration-damping layer 16 is 0.3 mm. Therefore, a ratio of the total thickness of the pure nickel sheets to the total sheet thickness (a nickel sheet ratio) is 6%. The sheet thickness of the composite material obtained after cold rolling was 2.1 mm. Finish rolling was further performed on the composite material, thereby obtaining a 2.0 mm-thick composite material.

Comparative Example 5

A SUS405 sheet having a thickness of 2.0 mm and wound in a coiled manner was prepared as the base material 12. In addition, a pure nickel sheet having a thickness of 1.5 mm and wound in a coiled manner was prepared as the first vibration-damping layer 14 and the second vibration-damping layer 16. Surfaces of the SUS405 sheet and of the two pure nickel sheets, which are to be facing surfaces when being stacked to form a three-layer structure shown in FIG. 1, were cleaned and brushed. The cleaned surfaces were exposed and cold rolling was performed in the air by the processing rolls 22, thereby respectively attaching the pure nickel sheets on both surfaces of the SUS405. The total thickness of these sheets before rolling is 5.0 mm. Meanwhile, the total thickness of the pure nickel sheets corresponding to the first vibration-damping layer 14 and the second vibration-damping layer 16 is 3.0 mm. Therefore, a ratio of the total thickness of the pure nickel sheets to the total sheet thickness (a nickel sheet ratio) is 60%. The sheet thickness of the composite material obtained after cold rolling was 2.1 mm. Finish rolling was further performed on the composite material, thereby obtaining a 2.0 mm-thick composite material.

Comparative Example 6

A SUS405 sheet having a thickness of 1.75 mm and wound in a coiled manner was prepared as the base material 12. In addition, a pure nickel sheet having a thickness of 1.63 mm and wound in a coiled manner was prepared as the first vibration-damping layer 14 and the second vibration-damping layer 16. Surfaces of the SUS405 sheet and of the two pure nickel sheets, which are to be facing surfaces when being stacked to form a three-layer structure shown in FIG. 1, were cleaned and brushed. The cleaned surfaces were exposed and cold rolling was performed in the air by the processing rolls 22, thereby respectively attaching the pure nickel sheets on both surfaces of the SUS405. The total thickness of these sheets before rolling is 5.01 mm. Meanwhile, the total thickness of the pure nickel sheets corresponding to the first vibration-damping layer 14 and the second vibration-damping layer 16 is 3.26 mm. Therefore, a ratio of the total thickness of the pure nickel sheets to the sheet thickness (a nickel sheet ratio) is 65%. The sheet thickness of the composite material obtained after cold rolling was 2.1 mm. Finish rolling was further performed on the composite material, thereby obtaining a 2.0 mm-thick composite material.

Comparative Example 7

A SUS409 sheet having a thickness of 4.7 mm and wound in a coiled manner was prepared as the base material 12. In addition, a pure nickel sheet having a thickness of 0.18 mm and wound in a coiled manner was prepared as the first vibration-damping layer 14 and the second vibration-damping layer 16. Surfaces of the SUS409 sheet and of the two pure nickel sheets, which are to be facing surfaces when being stacked to form a three-layer structure shown in FIG. 1, were cleaned and brushed. The cleaned surfaces were exposed and cold rolling was performed in the air by the processing rolls 22, thereby respectively attaching the pure nickel sheets on both surfaces of the SUS409. The total thickness of these sheets before rolling is 5.06 mm. Meanwhile, the total thickness of the pure nickel sheets corresponding to the first vibration-damping layer 14 and the second vibration-damping layer 16 is 0.36 mm. Therefore, a ratio of the total thickness of the pure nickel sheets to the total sheet thickness (a nickel sheet ratio) is 7%. The sheet thickness of the composite material obtained after cold rolling was 2.1 mm. Finish rolling was further performed on the composite material, thereby obtaining a 2.0 mm-thick composite material.

Comparative Example 8

A SUS409 sheet having a thickness of 1.5 mm and wound in a coiled mariner was prepared as the base material 12. In addition, a pure nickel sheet having a thickness of 1.75 mm and wound in a coiled manner was prepared as the first vibration-damping layer 14 and the second vibration-damping layer 16. Surfaces of the SUS409 sheet and of the two pure nickel sheets, which are to be facing surfaces when being stacked to form a three-layer structure shown in FIG. 1, were cleaned and brushed. The cleaned surfaces were exposed and cold rolling was performed in the air by the processing rolls 22, thereby respectively attaching the pure nickel sheets on both surfaces of the SUS409. The total thickness of these sheets before rolling is 5.0 mm. Meanwhile, the total thickness of the pure nickel sheets corresponding to the first vibration-damping layer 14 and the second vibration-damping layer 16 is 3.5 mm. Therefore, a ratio of the total thickness of the pure nickel sheets to the total sheet thickness (a nickel sheet ratio) is 70%. The sheet thickness of the composite material obtained after cold rolling was 2.1 mm. Finish rolling was further performed on the composite material, thereby obtaining a 2.0 mm-thick composite material.

Comparative Example 9

Base on the contents disclosed in JP-A-S64-014027, a 0.4 mm-thick resin sandwiched between two 0.8 mm-thick soft steel sheets was hot-pressed, thereby forming a laminated damping steel sheet having a sandwich structure of which total thickness is 2 mm.

Tests and Evaluations

Tests were conducted on each of the composite materials in Examples 1 to 6 and Comparative Examples 1 to 9 to evaluate whether or not having a vibration-damping property against vibration under the high-temperature environment and a predetermined tensile strength. Here, a damping coefficient is used as the numerical value indicating the vibration-damping property. The clad materials formed based on Examples 1 to 6 and Comparative Examples 1 to 9 were cut into a certain size, thereby making respective test pieces. Each test piece was heated to 200° C. in order to obtain characteristics under the high-temperature environment, and the vibration-damping property and the tensile strength were measured. For the vibration-damping properties, the test in accordance with JIS G 0602 "Test methods for vibration-damping property in laminated damping steel sheets of constrained type" was conducted such that the test piece was heated by a one-end fixing steady-state vibration method, and the damping coefficient of the test piece was measured. Meanwhile, the tensile strength was evaluated using a plate-like test piece in accordance with JIS G 0567 "Method of elevated temperature tensile test for steels and heat-resisting alloys".

Table 1 shows the test results of Examples 1 to 6 and Comparative Examples 1 to 9. Materials of the base material 12, a ratio of the total sheet thickness of the pure nickel to the sheet thickness of the entire clad material, the vibration-damping property measured at 200° C. and the tensile strength measured at 200° C. of each Example and Comparative Example are shown in each corresponding section of Examples 1 to 6 and Comparative Examples 1 to 9 in Table 1. For the evaluation of the damping coefficient, not less than 4.5% of the damping coefficient was evaluated as "○" (passed) as it is regarded that a sufficient vibration-damping property is obtained, and less than 4.5% of the damping coefficient was evaluated as "X" (failed). Meanwhile, for the evaluation of the tensile strength, not less than 400 MPa of the tensile strength was evaluated as "○" (passed) and less than 400 MPa of the tensile strength was evaluated as "X" (failed).

The comprehensive evaluation in Table 1 is based on the criteria in which the vibration-damping property and the tensile strength should be both achieved when the composite material formed of a clad material is used in an environment at 200° C., and the test piece which satisfies the conditions of not less than 4.5% of the damping coefficient and not less than 400 MPa of the tensile strength was judges as "○" (passed) in the comprehensive evaluation and the test piece which does not satisfy any of the above-mentioned conditions was judges as "X" (failed) in the comprehensive evaluation.

As shown in the evaluation results in Table 1, in Examples 1 to 6, the damping coefficient was not less than 4.5% and a good vibration-damping property was exhibited. In addition, in Examples 1 to 6, the tensile strength was also good which was not less than 400 MPa. Accordingly, Examples 1 to 6 can be judged as satisfactory in the comprehensive evaluation.

In contrast, in Comparative Examples 1, 2, 4 and 7, the nickel layers constituting the first vibration-damping layer 14 and the second vibration-damping layer 16 were thin and the vibration-damping property was not sufficient. In other words, the damping coefficient was less than 4.5% and the vibration-damping function against vibration was not sufficient. Meanwhile, in Comparative Examples 3, 5, 6 and 8, the tensile strength was not more than 400 MPa and was not sufficient. Therefore, all of Comparative Examples 3, 5, 6 and 8 can be judged as insufficient in the comprehensive evaluation.

In addition, in the laminated damping steel sheet described as Comparative Example 9, the damping coefficient as vibration damping performance and the tensile strength were both insufficient.

Although the invention has been described with respect to the specific embodiment for complete and clear disclosure, the appended claims are not to be therefore limited but are to be construed as embodying all modifications and alternative constructions that may occur to one skilled in the art which fairly fall within the basic teaching herein set forth.

What is claimed is:

1. A composite material, comprising:
a clad material comprising a base material consisting essentially of a ferrite-based stainless steel not containing nickel and vibration-damping layers that are provided on both surfaces of the base material and comprise a metal to suppress a vibration,
wherein each of the vibration-damping layers consists essentially of at least one of pure nickel, pure iron, pure magnesium, Al-78Zn, and Mg-0.6Zr,
wherein a total thickness of the vibration-damping layers provided on the both surfaces of the base material is in a

TABLE 1

| | Materials of Base material 12 | Sheet thickness ratio of Ni (%) | Damping coefficient at 200° C. (%) | Evaluation of damping coefficient | Tensile strength at 200° C. (MPa) | Evaluation of tensile strength | Comprehensive evaluation |
|---|---|---|---|---|---|---|---|
| Example 1 | Ni/SUS430/Ni | 10 | 4.6 | ○ | 436 | ○ | ○ |
| Example 2 | Ni/SUS430/Ni | 20 | 5.2 | ○ | 422 | ○ | ○ |
| Example 3 | Ni/SUS405/Ni | 10 | 4.6 | ○ | 436 | ○ | ○ |
| Example 4 | Ni/SUS405/Ni | 40 | 6.4 | ○ | 400 | ○ | ○ |
| Example 5 | Ni/SUS409/Ni | 15 | 4.9 | ○ | 428 | ○ | ○ |
| Example 6 | Ni/SUS409/Ni | 25 | 5.5 | ○ | 416 | ○ | ○ |
| Comparative Example 1 | Ni/SUS430/Ni | 2 | 4.1 | X | 447 | ○ | X |
| Comparative Example 2 | Ni/SUS430/Ni | 3 | 4.2 | X | 446 | ○ | X |
| Comparative Example 3 | Ni/SUS430/Ni | 50 | 7 | ○ | 380 | X | X |
| Comparative Example 4 | Ni/SUS405/Ni | 6 | 4.4 | X | 442 | ○ | X |
| Comparative Example 5 | Ni/SUS405/Ni | 60 | 7.6 | ○ | 346 | X | X |
| Comparative Example 6 | Ni/SUS405/Ni | 65 | 7.9 | ○ | 326 | X | X |
| Comparative Example 7 | Ni/SUS409/Ni | 7 | 4.4 | X | 441 | ○ | X |
| Comparative Example 8 | Ni/SUS409/Ni | 70 | 8.2 | ○ | 305 | X | X |
| Comparative Example 9 | Laminated damping steel sheet | — | 0.9 | X | 30 | X | X | range of not less than 10% and not more than 40% relative to a total thickness of the clad material.

2. The composite material according to claim 1, the clad material has a tensile strength of not less than 400 MPa at 200° C.

3. The composite material according to claim 1, wherein the clad material has a total thickness of not less than 1 mm and not more than 5 mm.

4. The composite material according to claim 1, wherein the vibration-damping layers comprise a same material and have substantially a same thickness.

5. The composite material according to claim 1, wherein the clad material and the vibration-damping layers are bonded at all points between their mutually-contacting surfaces.

6. A composite material, comprising:
a clad material comprising a base material that comprises an iron-chromium alloy and vibration-damping layers that are provided on both surfaces of the base material and comprise a metal to suppress a vibration,
wherein a total thickness of the vibration-damping layers provided on the both surfaces of the base material is in a range of not less than 10% and not more than 40% relative to a total thickness of the clad material,
wherein the clad material has a damping coefficient of not less than 4.5% at 200° C.

* * * * *